United States Patent
Asrani (10) Patent No.: US 9,772,428 B2
(45) Date of Patent: Sep. 26, 2017

(54) DETERMINING MICRO-CLIMATES BASED ON WEATHER-RELATED SENSOR DATA FROM MOBILE DEVICES

(71) Applicant: Google Technology Holdings LLC, Mountain View, CA (US)

(72) Inventor: Vijay L. Asrani, Round Lake, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 369 days.

(21) Appl. No.: 14/283,438

(22) Filed: May 21, 2014

(65) Prior Publication Data

US 2014/0372360 A1    Dec. 18, 2014

Related U.S. Application Data

(60) Provisional application No. 61/836,372, filed on Jun. 18, 2013.

(51) Int. Cl.
  *G06N 5/02* (2006.01)
  *G06F 17/00* (2006.01)
  *G01W 1/10* (2006.01)
  *G01W 1/00* (2006.01)

(52) U.S. Cl.
  CPC ........ *G01W 1/10* (2013.01); *G01W 2001/006* (2013.01)

(58) Field of Classification Search
  None
  See application file for complete search history.

(56) References Cited

U.S. PATENT DOCUMENTS

| | | | | |
|---|---|---|---|---|
| 5,850,619 A * | 12/1998 | Rasmussen | ............. | G01W 1/14 342/26 D |
| 6,728,552 B2 * | 4/2004 | Chatain | .................... | G01C 5/06 340/990 |
| 7,069,258 B1 * | 6/2006 | Bothwell | ................. | G06N 7/06 706/12 |
| 7,212,922 B1 * | 5/2007 | Longacre | ................ | G01W 1/10 702/3 |
| 8,854,219 B2 * | 10/2014 | Assuncao | ............... | G01W 1/10 340/601 |

(Continued)

FOREIGN PATENT DOCUMENTS

JP    06230146 A  *  8/1994

OTHER PUBLICATIONS

Thepvilojanapong et al., "A Deployment of Fine-Grained Sensor Network and Empirical Analysis of Urban Temperature", Mar. 18, 2010, Sensors, vol. 10, pp. 2217-2241.*

(Continued)

*Primary Examiner* — Paulinho E Smith
(74) *Attorney, Agent, or Firm* — Troutman Sanders LLP; James E. Schutz; Christopher C. Close, Jr.

(57) ABSTRACT

Certain example implementations of the disclosed technology can include techniques and apparatuses for determining micro-climates based on weather-related sensor data from mobile devices. In some embodiments, current and projected micro-climates can be determined for multiple micro-locations. With micro-climate information, a user may better plan his or her day, including what to wear, which path to walk to work, and what activities to plan.

18 Claims, 10 Drawing Sheets

(56) References Cited

U.S. PATENT DOCUMENTS

| | | | |
|---|---|---|---|
| 2002/0092965 A1* | 7/2002 | Addink | G01W 1/10 250/203.4 |
| 2003/0182259 A1* | 9/2003 | Pickett | A01B 79/005 |
| 2005/0222771 A1* | 10/2005 | Matsumoto | G01W 1/10 702/3 |
| 2010/0274542 A1* | 10/2010 | Krupansky | G01W 1/10 703/6 |
| 2012/0065783 A1* | 3/2012 | Fadell | F24F 11/006 700/276 |
| 2012/0270566 A1* | 10/2012 | Persson | G01C 5/06 455/456.3 |
| 2012/0316455 A1* | 12/2012 | Rahman | G01C 22/006 600/547 |
| 2013/0204451 A1* | 8/2013 | Staehle | G01W 1/10 700/291 |
| 2013/0338839 A1* | 12/2013 | Rogers | G05D 23/1904 700/278 |
| 2014/0058572 A1* | 2/2014 | Stein | G06Q 50/06 700/291 |
| 2014/0067733 A1* | 3/2014 | Humann | G05B 13/02 706/12 |
| 2014/0135040 A1* | 5/2014 | Edge | H04W 4/028 455/456.6 |
| 2014/0136089 A1* | 5/2014 | Hranac | G08G 1/0962 701/118 |
| 2014/0324351 A1* | 10/2014 | Dannevik | G01W 1/10 702/3 |
| 2014/0372039 A1* | 12/2014 | Leblanc | G01W 1/10 702/3 |
| 2014/0372360 A1* | 12/2014 | Asrani | G01W 1/10 706/47 |
| 2015/0095830 A1* | 4/2015 | Massoumi | G06F 3/04842 715/771 |
| 2015/0134798 A1* | 5/2015 | Tofighbakhsh | H04L 67/22 709/223 |
| 2015/0160372 A1* | 6/2015 | Liang | H04W 4/02 702/3 |
| 2015/0178865 A1* | 6/2015 | Anderson | G05B 17/02 705/7.25 |
| 2015/0362624 A1* | 12/2015 | Wada | G01W 1/00 702/3 |
| 2016/0116640 A1* | 4/2016 | Phillips | G01W 1/10 702/3 |

OTHER PUBLICATIONS

Paul Sawers, "Discussing the Weather? There's an App for that.", Nov. 28, 2011, pp. 1-6.*
Jamie Condliffe, "Road Trip Planner Lets You Choose a Route With the Best Weather", Jun. 19, 2012, pp. 1-2. (URL: http://gizmodo.com/5919495/road-trip-planner-lets-you-choose-a-route-with-the-best-weather).*
Overeem et al., "Crowdsourcing Urban Air Temperature from Smartphone Battery Temperatures", Aug. 14, 2013, Geophysical Research Letters, vol. 40, pp. 4081-4085.*
Samantha-Rae Tuthill, "Be Prepared with Road Trip Planner", Jun. 20, 2012, pp. 1-3. (URL: www.accuweather.com/en/features/trend/be-prepared-with-road-trip-pla/66147).*
Hancke et al., "The Role of Advanced Sensing in Smart Cities", Dec. 27, 2012, Sensors, pp. 393-425.*
Sagl et al., "Ubiquitous Geo-Sensing for Context-Aware Analysis: Exploring Relationships between Environmental and Human Dynamics", Jul. 18, 2012, pp. 9800-9822.*
Theo Merz, "Weather Crowdsourcing App Could Track Passing of Single Clouds", Aug. 15, 2013, pp. 1-2.*
Paul Sawers, "WeatherSignal Wants to Create Crowdsourced Weather Reports using Andriod Phone Sensors", May 8, 2013, pp. 1-5.*
iPhone Crowdsources Weather Reports, http://dailycrowdsource.com/20-resources/projects/488-iphone-crowdsources-weather-reports, pp. 1-2, Downloaded from the Internet on Mar. 6, 2013.
Activity Recognition From User-Annotated Acceleration Data, http://www.cs.washington.edu/education/courses/cse590u/05wi/590uc-wi05-papers/BI04.pdf, pp. 2, 4, and 14, Downloaded from the Internet on Mar. 6, 2013.

* cited by examiner

DETERMINING MICRO-CLIMATES BASED ON WEATHER-RELATED SENSOR DATA FROM MOBILE DEVICES

BACKGROUND

Currently, many users plan their day based on weather forecasts, such as what clothes to wear and what activities to do. These forecasts, however, have only varied success at predicting weather, as many forecasts indicate that it will rain but it does not, that there will be a 15 mile-per-hour wind when it ends up being 30 miles-per-hour, or that it will be mostly cloudy when it ends up being sunny. As anyone that has used these forecasts can attest, these forecasts are often wrong.

Further, meteorologists determining these weather forecasts commonly base their predictions on large-scale weather formations. Because of this, these forecasts are directed to large regions of a state, province, or country. Even when these predictions are accurate for a large region, often small parts of those regions have different weather, sometimes substantially different weather. It may, for example, be calm and sunny through most of a 1000-square-kilometer area but at a particular park be both windy and raining. If a user wishes to go to this park, such differences in weather can greatly affect his or her day, as the user will show up at the park expecting calm winds and sun and be greeted with both wind and rain.

SUMMARY

This disclosure describes techniques and apparatuses for determining micro-climates based on weather-related sensor data from mobile devices. In some embodiments, current and projected micro-climates can be determined for multiple micro-locations. With these micro-climates a user may better plan his or her day, including what to wear, which path to walk to work, and what activities to plan.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

BRIEF DESCRIPTION OF THE DRAWINGS

Techniques and apparatuses for determining micro-climates based on weather-related sensor data from mobile devices are described with reference to the following drawings. The same numbers are used throughout the drawings to reference like features and components.

DETAILED DESCRIPTION

Overview

Current techniques for predicting weather conditions are often poor at accurately predicting weather at micro-locations, such as the weather at a park, down a street, or in a sheltered bay. This disclosure describes techniques and apparatuses for determining micro-climates based on weather-related sensor data from mobile devices.

By way of example, consider a user that walks to a subway station on weekdays between 6:15 am and 6:30 am. Assume that the subway station is six blocks from his apartment and that he typically walks two blocks directly south, then two blocks west, and then two more blocks south, at which time he arrives at the station. Currently, at 6:10 am when he is about to walk out the door, he checks the general weather forecast for his city. The forecast for this morning, between 6 am and 7 am, predicts a 10% chance of rain, winds five to ten kilometers an hour, temperature of ten degrees Celsius, and mostly cloudy. Based on this prediction, assume that the user would normally put a light jacket over his usual business attire and that he would forgo taking an umbrella, as the prediction for rain is only 10%.

In contrast, consider the same user aided by the techniques. Assume that the user still walks to the station between 6:15 am and 6:30 am. When he checks the weather at 6:10 am, however, assume that the techniques provide a current micro-climate on his mobile device. The micro-climate shows, with a high degree of accuracy and minute-to-minute current conditions, that the first two blocks of his walk are 12 degrees Celsius, winds are of five kilometers an hour, and that it is mostly cloudy. For the western two blocks of his walk, the techniques provide a micro-climate of ten degree Celsius, winds of 15 kilometers an hour, rain, and fully cloudy. For the last two blocks the techniques provide a micro-climate about the same as the first two blocks. At this point the user may decide to take his umbrella, as he has two blocks to walk in the rain, or a rain jacket with hood instead of his light jacket.

Furthermore, in some embodiments, the techniques map out an alternative route. In this example, the alternative route can be provided where east-prevailing winds and rain are blocked by large buildings (as they are in the southern portions of this user's walk). With this map, the user has up-to-the-minute micro-climates and alternatives by which to decide how to dress or even which way to walk to avoid the rain and wind.

The following discussion first describes an operating environment, followed by techniques that may be employed in this environment, an example user interface, and then proceeds with an example device.

Example Environment

Figure 1:
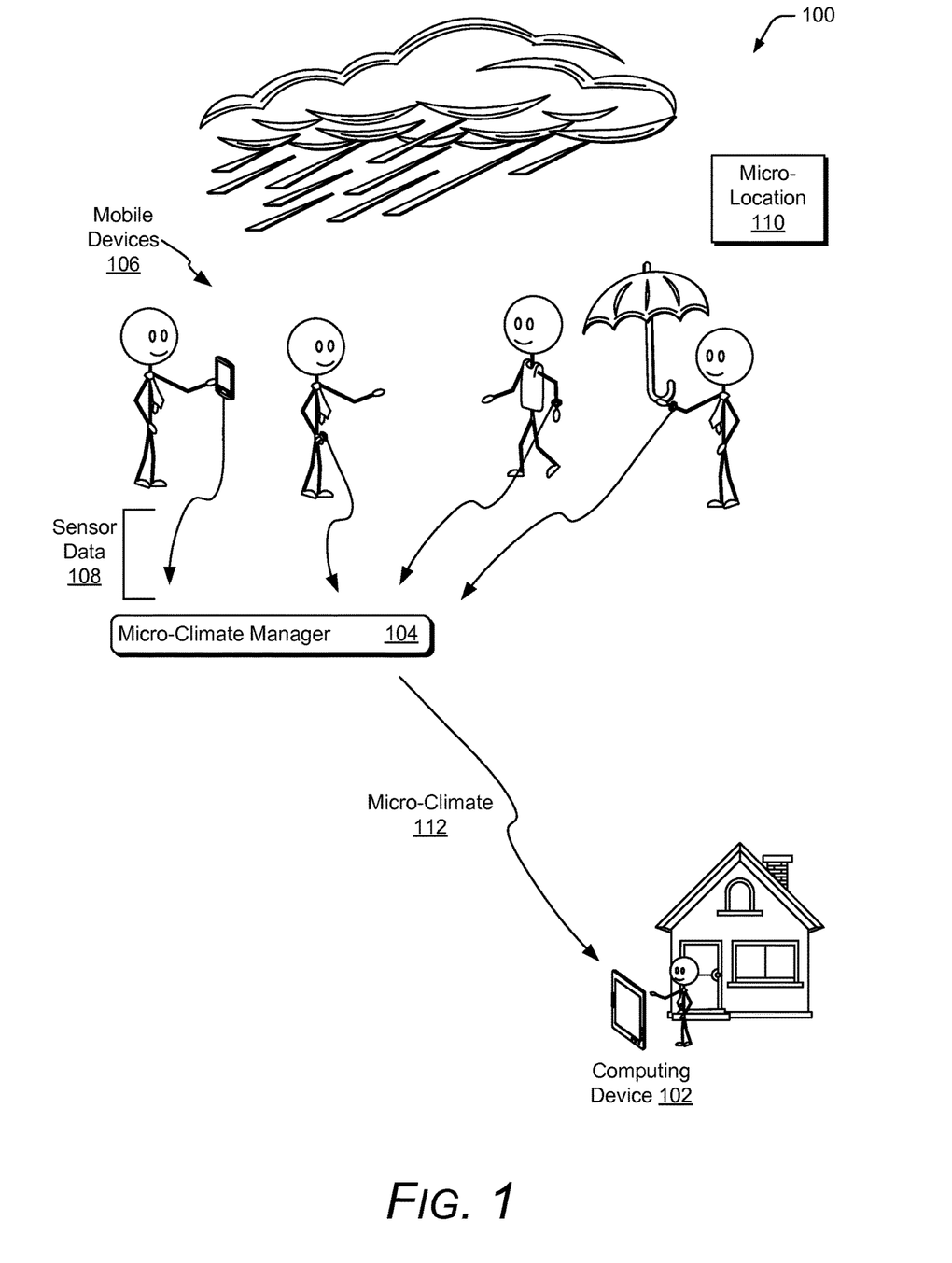
FIG. 1 illustrates an example environment in which techniques for determining micro-climates based on weather-related sensor data from mobile devices can be implemented.

FIG. 1 illustrates an example environment 100 in which techniques for determining micro-climates based on weather-related sensor data from mobile devices can be implemented. Example environment 100 includes a computing device 102 associated with a user, a micro-climate manager 104, and multiple mobile devices 106. Each of mobile devices 106 provides weather-related sensor data 108 to micro-climate manager 104. Micro-climate manager 104 then determines, based on the weather-related sensor data 108 and a micro-location 110 in which mobile devices 106 are located, a micro-climate 112 for micro-location 110. Micro-climate manager 104 is shown separate from computing device 102, though it can be integrated with computing device 102. This discussion now turns to detailed examples of these elements starting with computing device 102.

Figure 2:
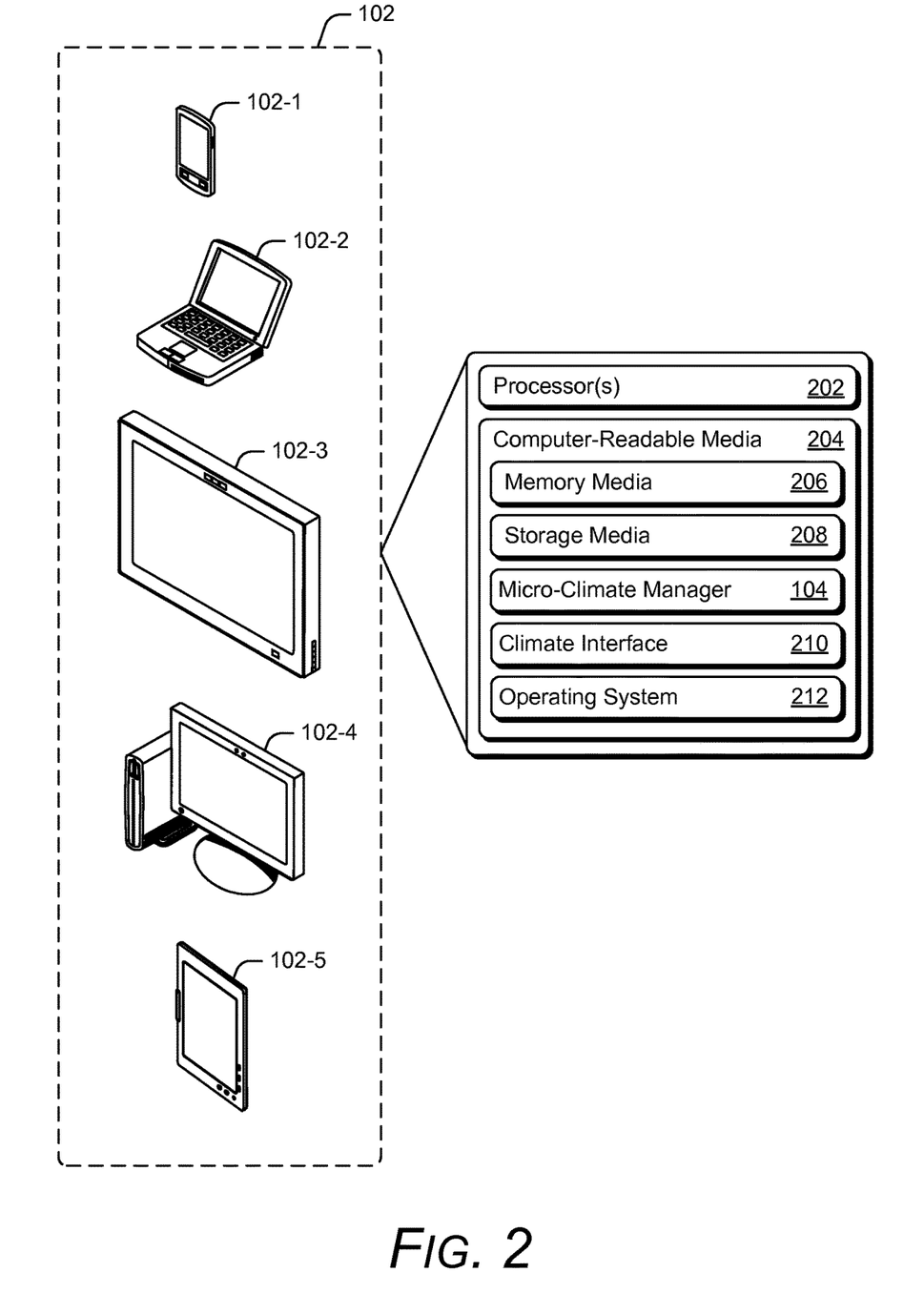
FIG. 2 illustrates a detailed example of the computing device of FIG. 1.

FIG. 2 illustrates a detailed example of computing device 102 having processor(s) 202 and computer-readable media 204, which includes memory media 206 and storage media 208. Computer-readable media 204 includes micro-climate manager 104, climate interface 210, and operating system 212. Applications can be embodied as computer-readable instructions on memory media 206, which can be executed by processor(s) 202 to provide some or all of the functionalities described for computing device 102.

Generally, micro-climate manager 104 is capable of determining, based on current weather-related sensor data, a current or projected micro-climate for a micro-location. Ways in which micro-climate manager 104 is implemented and used varies, and is described as part of methods discussed below.

Climate interface 210 is described in detail later in this document along with example interfaces. In general, however, climate interface 210 provides micro-climates and associated micro-locations to a user of computing device 102.

Computing device 102 is illustrated, by way of example and not limitation, as one of a smart phone 102-1, laptop computer 102-2, television device 102-3, desktop computer 102-4, or tablet computer 102-5, though other devices may also be used, such as a smart watch, smart ring, home appliance (e.g., a refrigerator or smart home), smart glasses, netbooks, servers, and so forth. This discussion now turns to mobile device 106.

Figure 3:
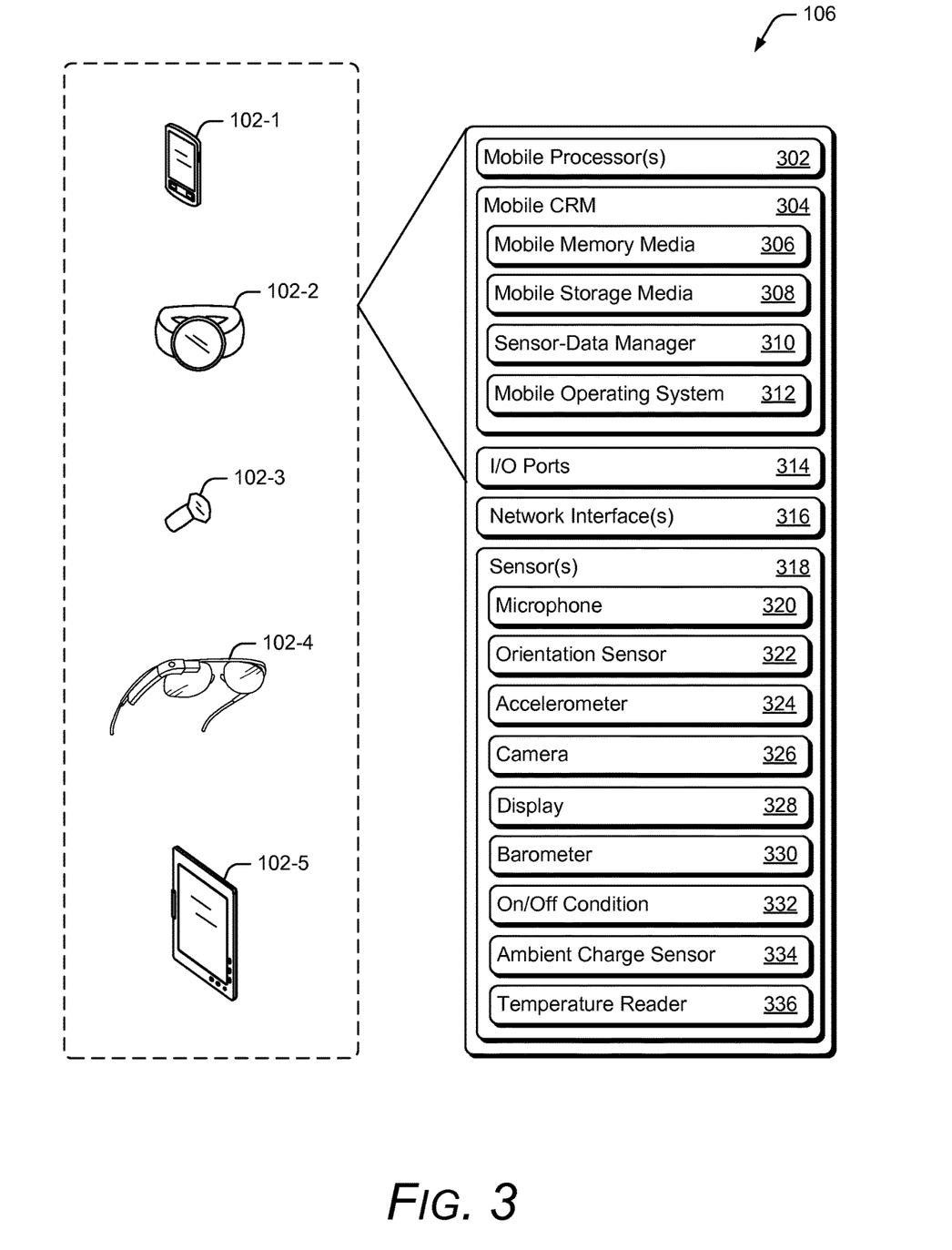
FIG. 3 illustrates a detailed example of one of the mobile devices of FIG. 1.

FIG. 3 illustrates a detailed example of one of mobile devices 106, along with various examples of different types of mobiles devices. Mobile device 106 includes one or more mobile processors 302, mobile computer-readable storage media (mobile CRM) 304, mobile memory media 306, mobile storage media 308, sensor-data manager 310, and mobile operating system 312. Applications can be embodied as computer-readable instructions on memory media 206, which can be executed by processor(s) 202 to provide some or all of the functionalities described for computing device 102.

Sensor-data manager 310 is capable of recording, analyzing, tracking, and/or providing sensor data sensed by sensors 318 to micro-climate manager 104. Sensor-data manager 310 may also or instead cause sensors 318 to record or otherwise sense sensor data. Thus, sensor-data manager 310 can cause a microphone to record audio, analyze the audio to determine that the audio indicates wind, and provide this portion of the audio or the analysis to micro-climate manager 104.

Weather-related sensor data 108 can explicitly indicate weather conditions, such as a barometer sensing a pressure change, a temperature reader sensing the temperature, a humidity sensor sensing humidity, or a camera sensing light intensity. Non-sensor data can also explicitly indicate weather conditions, such as a user selecting a button on an interface to indicate rain or wind. Much of weather-related sensor data 108 described herein, however, includes sensor data that is interpretable but does not explicitly indicate a weather condition. This interpretable sensor data includes, for example, an orientation of a mobile device. This orientation can be interpreted as a gesture or position, which in turn can be interpreted, based on historic user data, to indicate rain based on the gesture or position correlating to users holding umbrellas. Some weather-related sensor data 108 may seem to explicitly indicate weather conditions, but in practical terms must first be interpreted, such as audio from a microphone that, absent interpretation, can be either wind or the microphone being rubbed against clothing. Additional examples of explicit weather-related sensor data and interpretable weather-related sensor data are set forth below.

Mobile device 106 includes I/O ports 314, network interfaces(s) 316, and one or more sensors 318. I/O ports 314 enable interaction with other devices, media, or users. I/O ports 314 can include a variety of ports, such as high-definition multimedia (HDMI), digital video interface (DVI), display port, fiber-optic or light-based, audio ports (e.g., analog, optical, or digital), USB ports, serial advanced technology attachment (SATA) ports, peripheral component interconnect (PCI) express based ports or card slots, serial ports, parallel ports, or other legacy ports.

Network interface(s) 316 are capable of communicating sensor (and other) data over wired, wireless, or optical networks. Data communicated over such networks may include weather-related sensor data. By way of example, network interface 316 may communicate data over a local-area-network (LAN), a wireless local-area-network (WLAN), a personal-area-network (PAN), a wide-area-network (WAN), an intranet, the Internet, a peer-to-peer network, point-to-point network, a mesh network, and the like.

Sensors 318 include one more sensors capable of sensing weather-related data, including: microphone 320; orientation sensor 322; accelerometer 324; camera 326; display 328; barometer 330; on/off condition 332; ambient charge sensor 334; and/or temperature reader 336. Each of various sensors 318 may sense conditions that may in turn be interpreted to determine weather conditions, and thus a micro-climate.

Consider, by way of example and not limitation, each of these sensors and examples of what they sense related to weather. Microphone 320 can sense sounds that are interpreted to indicate wind, thunder, rain, and being put in a pocket, possibly by the user to avoid getting the device wet.

Orientation sensor 322 can sense a user's gestures, such as holding up an umbrella, turning up or down a user's collar, zipping up a jacket, putting hands in a pocket, and the like, which can then be interpreted to indicate a weather condition (e.g., wind, cold, rain).

Accelerometer 324 can sense some of the gestures of the orientation sensor 322, as well as a user walking slowing, presumably because the weather is good (in some cases), running, which can be interpreted to indicate that someone is trying to get out of the rain, walking fast, often due to uncomfortable weather (rain, wind, snow, hail), and so forth.

Camera 326 can sense wind and rain through pictures (still or moving) of items being blown about, rain or snow or hail falling, an amount of ambient light (cloudy or sunny) and so forth. Some devices have cameras working much of the time, such as some smart glasses, and thus these can sense up-to-the-minute or up-to-the-second conditions. Sensor data received by camera 326 can be explicit or interpretable as noted.

Display 328 can sense interaction failures, which can be interpreted to be caused by the display being wet, or caused by a user trying to use gloves or with wet or cold (and thus less nimble) fingers, and so forth.

Barometer 330 can sense pressure and pressure changes, which not only indicate current conditions but can be used to predict a change in current conditions.

On/off condition 332 can be a sensor or some indicator that the user has turned on or off his or her mobile device 106, which may indicate that it is too cold, rainy, or windy for use of some devices, and so forth. For example, many people will not browse the internet on a smart phone in the rain or when it is so cold and windy as to require gloves (which also affects use of the device, which also can be sensed).

Ambient charge sensor 334 can sense electrical charge in the air, which may indicate a thunder storm, lightning, and other weather conditions. Sensor data from ambient charge sensor 334 is generally explicit weather-related sensor data, as it often indicates a weather condition without interpretation.

Temperature reader 336 can sense temperature and temperature changes, which are generally explicit sensor data. This discussion now turns to an example server computer having micro-climate manager 104.

Figure 4:
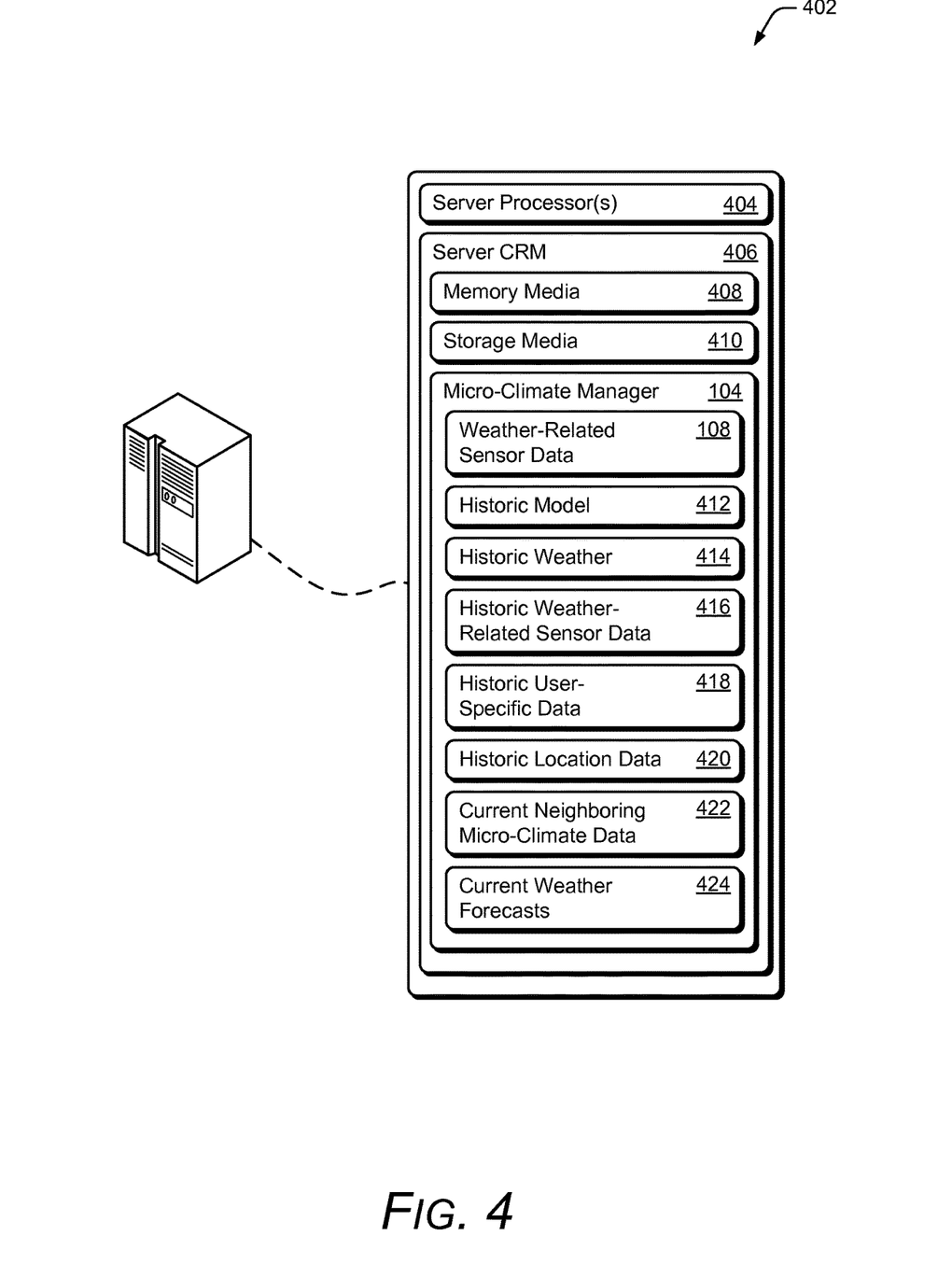
FIG. 4 illustrates a server computer having the micro-climate manager of FIG. 1.

FIG. 4 illustrates a detailed example of a server computer 402 having micro-climate manager 104. As noted above, micro-climate manager 104 may be separate from, or integral with, computing device 102 of FIG. 1. In this example, sensor data 108 is received, at server computer 402, by micro-climate manager 104 from sensor-data managers 310 of respective mobile devices 106 (as shown in FIG. 1). Micro-climate manager 104 then provides micro-climates, such as through a web-enabled resource, or in other manners known for providing data to computing devices.

Generally, server computer 402 includes server processor(s) 404 and server computer-readable media (server CRM) 406, which includes server memory media 408 and server storage media 410. Server computer-readable media 406 includes micro-climate manager 104, which itself may include or have access to weather-related sensor data 108 as well as an historic model 412, historic weather 414, historic weather-related sensor data 416, historic location data 420 for various micro-locations, current neighboring micro-climate data 422, and current weather forecasts 424. Note that the term "historic" when used in the context of data can include data that is old or recent. Thus, historic weather 414, historic weather-related sensor data 416, historic user-specific data 418, and historic location data 420 can include data from as little as 30 minutes ago to 20 or even hundreds of years ago.

Historic model 412 correlates historic weather 414 and historic weather-related sensor data 416. Historic model 412 can be used to determine current or projected weather conditions based on current weather-related sensor data 108. Historic weather 414 can be known or determined from various sources, such as news sources, government weather sources, local weather recordings, historic forecasts, and so forth. Historic weather-related sensor data 416 includes data about sensor data received from mobile devices, such as those from sensors 318 of mobile device 106 of FIG. 3.

Figure 5:
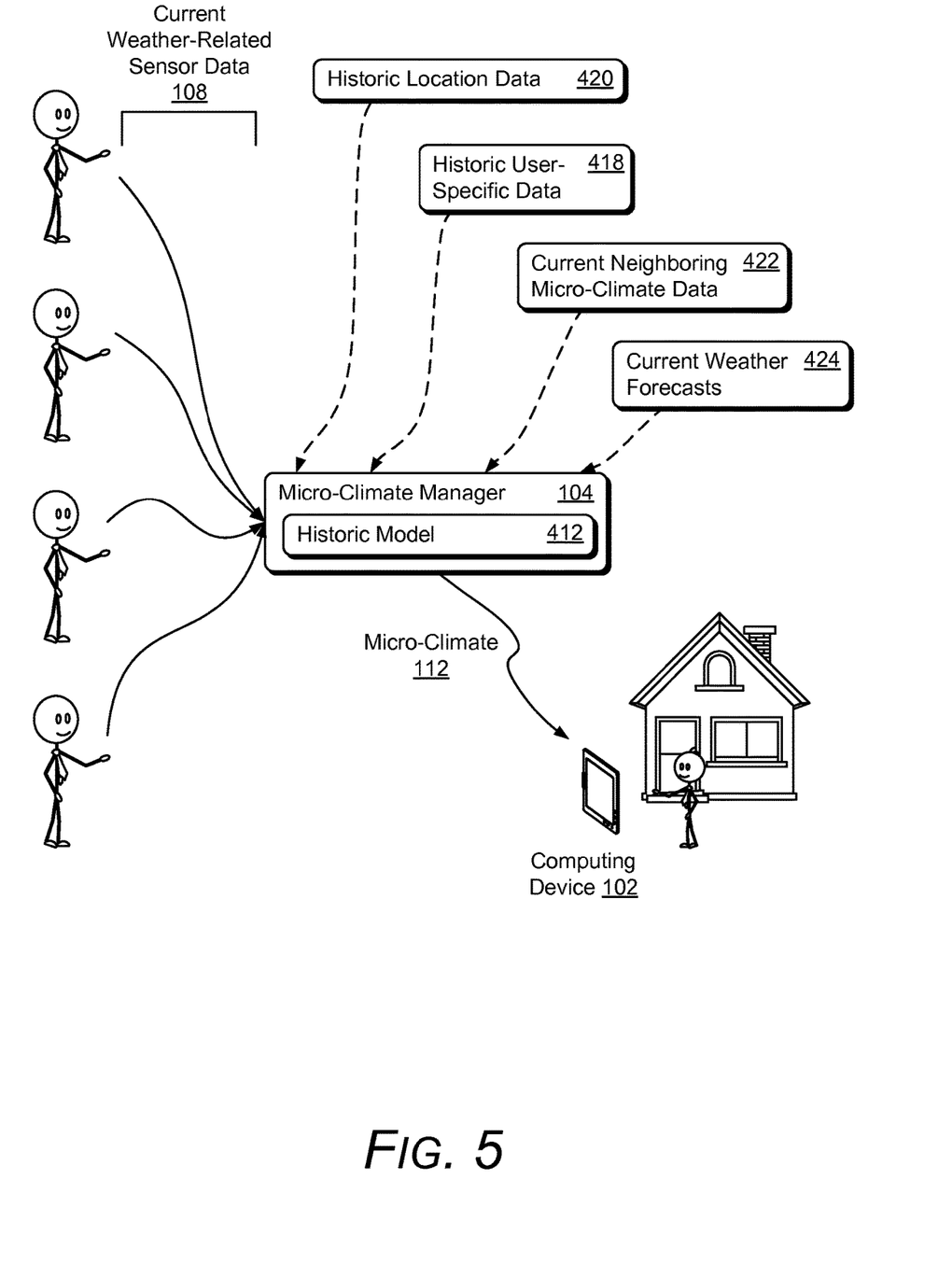
FIG. 5 illustrates alternative data sources usable to determine current micro-climates.

In some cases, current or projected micro-climates can be determined using weather-related sensor data 108 along with other data, such as historic user-specific data 418, historic location data 420, current neighboring micro-climate data 422, or current weather forecasts 424. Use of these alternative data sources to determine current micro-climates is illustrated in FIG. 5. Note that micro-climate manager 104 includes historic model 412 and receives current weather-related sensor data 108 from various mobile devices 106 associated with various users, as well as historic user-specific data 418, historic location data 420, current neighboring micro-climate data 422, and current weather forecasts 424. Using zero, one, or multiples of these data, along with current weather-related sensor data 108, micro-climate manager 104 determines a current micro-climate for a micro-location and provides this to a user through computing device 102.

In more detail, historic user-specific data 418 can be for one of the users of mobile devices 106 from which current weather-related sensor data 108 is received. This data can enable micro-climate manager 104 to determine that a particular type of sensor data has a particular relationship to weather conditions. Historic weather-related sensor data 418 can be used by sensor-data manager 310 at mobile device 106 alternatively or in addition to use at micro-climate manager 104. For example, if this user has a history of running when in the rain, rather than holding up an umbrella, this correlation can be known. Sensor data from an accelerometer in his smart phone, for example, that indicates that the user is running, can be positively correlated to rain. Conversely, sensor data from an orientation sensor indicating that he is holding up his arm can be negatively correlated to rain (e.g., he may be holding up his arm to hail a taxi cab, as he does not carry an umbrella).

Similarly, historic location data 420 can be used as an aid in determining a micro-climate at a micro location. For example, when determining a current micro-climate for a micro-location, historic location data 420 for that micro-location may indicate a likelihood of various weather conditions. A particular street in New York City may commonly be windy, or be windier than other streets, or be windier than the weather forecast historically predicts. This can often be the case for micro-locations due to wind tunneling through buildings, hills, and so forth. Thus, micro-climate manager 104 may augment or otherwise use this information to tailor a micro-climate determination. If, for example, without this historic location data 420 the techniques determine that the wind is highly likely to be between 15 and 20 miles per hour, the techniques may indicate the higher end of the likely range of 20 miles per hour as the current micro-climate.

As noted, current neighboring micro-climate data 422 may also be used. Assume, for example, that weather-related sensor data 108 is received from 48 people at a street one block from, and directly parallel to, the micro-location of interest. Assume also that weather-related sensor data 108 is received from only six people at the micro-location of interest. The neighboring micro-climate may be determined, based on the high number of users on that street, with a high degree of accuracy. With only six users on this street, however, a wide range of possible weather conditions may be possible based on the data received. If historic data indicates a strong correlation between the neighboring micro-location (the parallel street) micro-climate manager 104 may use the micro-climate from the neighbor as an aid in determining the micro-climate on the desired street. Parallel streets, adjacent areas, and so forth can each be used, as can somewhat remote areas or streets if the historic correlations are strong. Thus, if a street two miles away has a strong correlation for wind with this street, it can be used as an aid in determining the wind of this street even though it is not geographically very close.

Further still, current weather forecasts 424 can also be used. Thus, if a region in which the micro-location resides (e.g., a town in which a park resides) predicts a cloudy day and micro-climate manager 104 determines, absent a current weather forecast 424, that the park is likely to be either sunny or partly sunny, micro-climate manager 104 may provide a partly sunny micro-climate for the park based on the current weather forecast for the town indicating that the park is more likely to be partly sunny than sunny because the town's forecast is cloudy.

Example Methods

Figure 6:
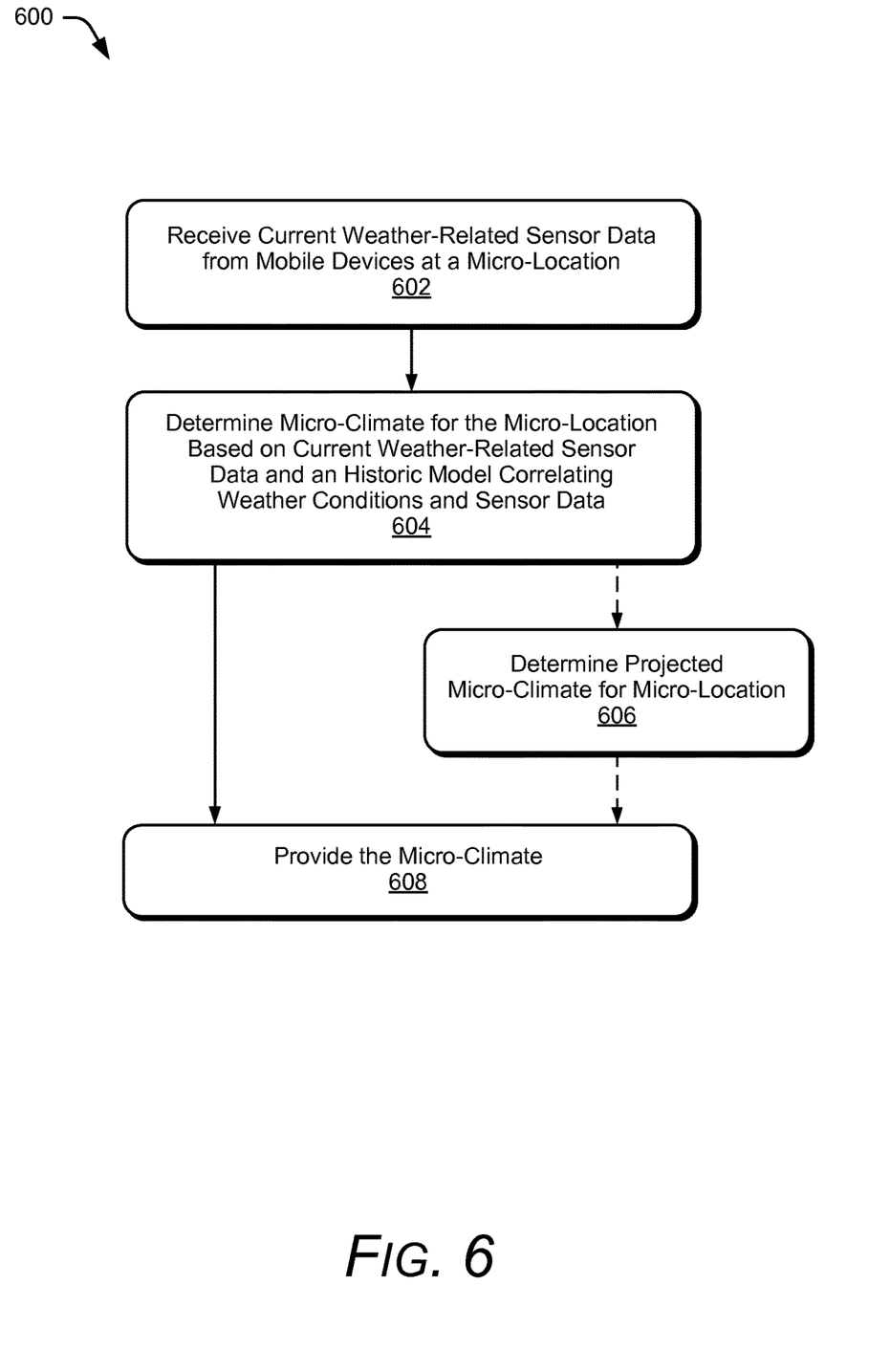
FIG. 6 illustrates example methods for determining micro-climates based on weather-related sensor data from mobile devices.

FIG. 6 illustrates example methods 600 for determining micro-climates based on weather-related sensor data from mobile devices. The order in which blocks of these and other methods are illustrated is not intended to be construed as a limitation, and any number or combination of the blocks in these and other methods herein can be combined in any order to implement a method or an alternate method.

At block 602, current weather-related sensor data is received from mobile devices associated with users, the current weather-related sensor data sensed by the mobile devices at a micro-location. Examples of weather-related sensor data, mobiles devices, and micro-locations are described in detail in relation to FIGS. 1-5 above. Also, these methods 600 can be performed by micro-climate manager 104, whether acting at server 402, computing device 102, or at one or more other locations, whether in whole or in part.

At block 604, a current micro-climate for the micro-location is determined based on the current weather-related sensor data and an historic model correlating weather conditions and sensor data. This current micro-climate is based on sensor data that, in some cases, is updated minute-by-minute or even second-by-second. Thus, the current micro-climate can be accurate within even seconds of the weather conditions sensed at the micro-location. In some cases a current micro-climate is based on sensor data received over the last five or ten minutes or even longer, such as in cases where a number of mobile devices providing weather-related sensor data is limited.

Alternatively or in addition, methods 600 may proceed to block 606, at which a projected micro-climate for the micro-location is determined based on the current micro-climate. Determining a projected micro-climate can be performed based on statistical analysis, such as a likelihood that a windy, rainy, street will still be windy and rainy in ten minutes, for example. In some cases neighboring micro-climates are also or instead used, such as multi-time micro-climates for neighboring micro-locations. Consider, for example, multi-time micro-climates for two micro-locations fairly near to a current micro-location of interest. Assume that micro-climate manager 104 has received information indicating that rain started at $42^{nd}$ street ten minutes ago and ended at $42^{nd}$ street five minutes ago, started five minutes ago at $48^{th}$ street and just ended at $48^{th}$ street, and thus at the current micro-location of interest of $52^{nd}$ street, where it is currently raining, that it will likely end four minutes from now. Similarly, micro-climate manager 104 may determine that a micro-rain pattern is moving north-northwest at two miles-per-hour and lasts for about six minutes at it moves through various streets.

At block 608, the current micro-climate is provided to a user. This user may have requested the current micro-climate or an entity may have determined that the user is projected to soon be at the micro-location (e.g., one, five, or 30 minutes from the micro-location), or for other reasons. In the examples of FIGS. 1 and 5, micro-climate 112 is provided to the user through computing device 102.

Figure 7:
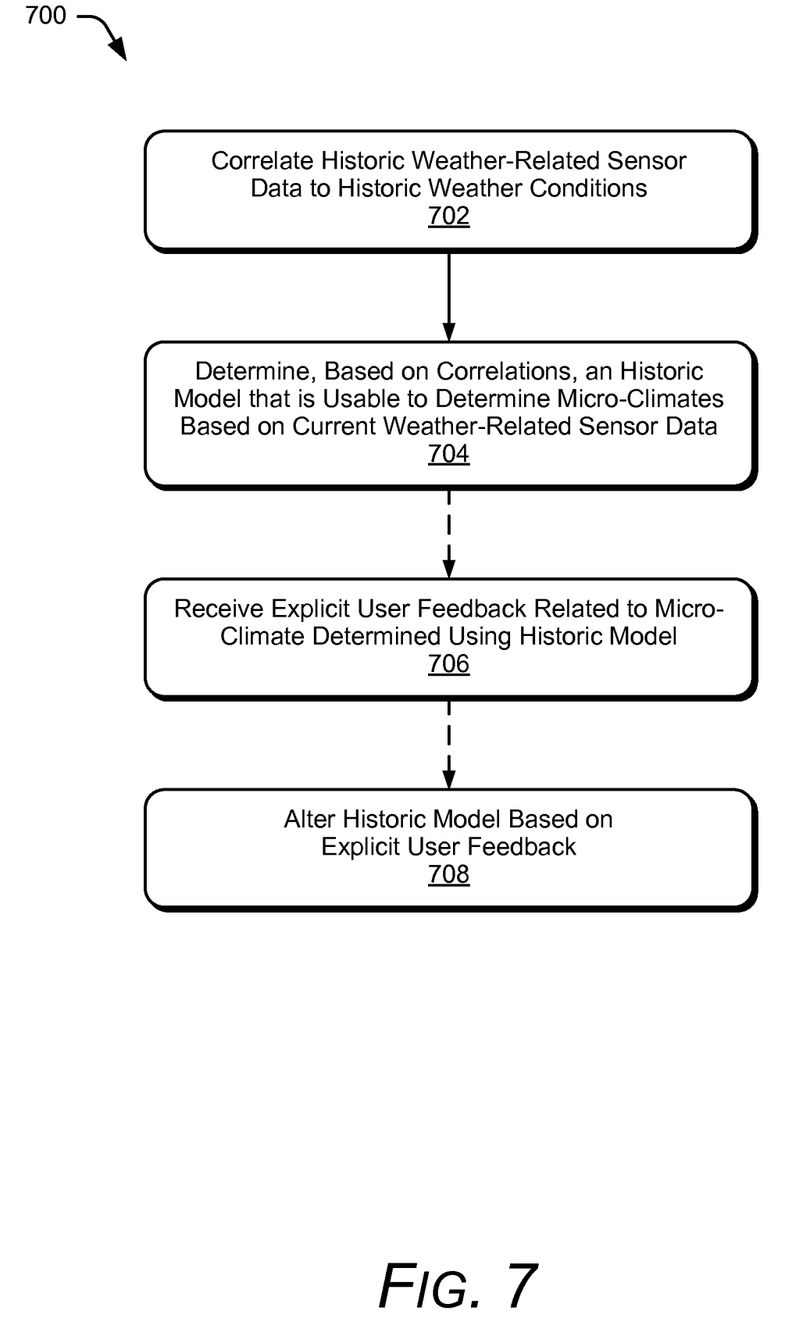
FIG. 7 illustrates example methods for determining an historic model usable to determine a micro-climate based on weather-related sensor data.

FIG. 7 illustrates example methods 700 for determining an historic model usable to determine a micro-climate based on weather-related sensor data.

At block 702, historic weather conditions are correlated to historic weather-related sensor data sensed by mobile devices. This historic weather-related sensor data may include, as noted above, one or more of an audio recording of a microphone, an orientation reading, a movement read by an accelerometer, an image or video recording of a camera, a pressure reading of a barometer, an ambient electrical charge, an on or off condition, and/or an effectiveness of a touch screen or other display.

At block 704, an historic model is determined based on the correlations of the historic weather conditions and the historic weather-related sensor data. This historic model can be used to determine current micro-climates or predict micro-climates based on weather-related sensor data received from mobile devices.

Ways in which the historic model correlates weather with sensor data can vary based on regions, micro-locations, and even cultures in which the sensor data is received. Thus, the techniques may correlate historic weather conditions for a geographical region to historic weather-related sensor data sensed by mobile devices at micro-locations within the geographical region. The historic model can be used to predict micro-climates at the micro-locations within the geographical regions. Consider, for example, differences in how people in one city may react to weather, which affects how weather-related sensor data is analyzed and correlated. In Seattle, Wash. (in the USA), for example, many people surprisingly do not use umbrellas or walk faster in the rain. This may be counter-intuitive, but it rarely rains heavily in Seattle and it rains lightly so often that many people are used to it (or have given up fighting it) and thus continue on without altering their behavior. A light rain falling in La Serena, Chile, which receives almost no rain each year, however, may instead alter peoples' behavior, as they are not used to rain.

Similarly, some cultures affect how people react to weather. Thus, the techniques may correlate historic weather conditions of a people group to historic weather-related sensor data sensed by mobile devices associated with users of that people group to more accurately determine micro-climates. Consider cultures, for example, where people generally wear hats or other head coverings very nearly all of the time. In such cases, people are less likely to alter their behavior for light rain but may be more likely to alter their behavior for wind (e.g., with gestures to hold their hats on so they do no blow away). These regional and cultural differences are but two examples of ways in which the techniques may address and make accurate the historic model.

Optionally, methods 700 may proceed to blocks 706 and 708. At 706, explicit user feedback related to a micro-climate determined based on the historic model is received. This explicit user feedback can confirm, correct, or reject the micro-climates. Consider a case where the historic model is used to provide a current micro-climate (e.g., such as illustrated in FIG. 6) indicating rain at a micro-location. A user receiving this current micro-climate may indicate, such as through a user interface, that it is not raining. This explicit user feedback can then be used to alter the historic model at 708. In some cases this alteration is tailored based on a particular micro-location, region, culture, or city, for example. In such a case, the historic model can be altered for the specific situation, such as for the particular micro-location, though it may also be used to alter the historic model in general as well.

Figure 8:
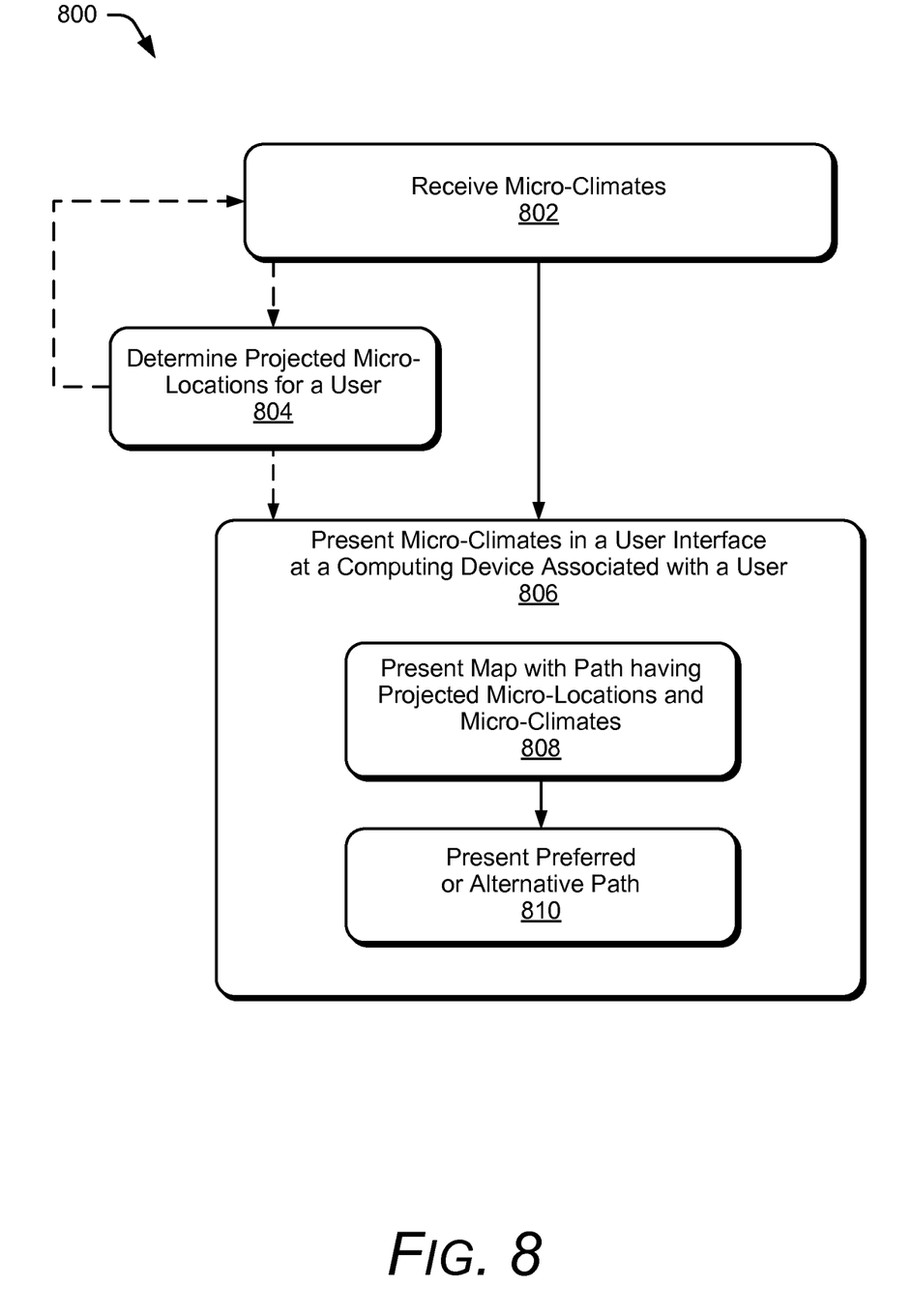
FIG. 8 illustrates example methods for presenting micro-climates in a user interface.

FIG. 8 illustrates example methods 800 for presenting micro-climates in a user interface. At block 802, current micro-climates or projected micro-climates are received for micro-locations. These micro-climates can be received at a computing device associated with a user, such as computing device 102 of FIGS. 1, 2, and 5. These micro-climates can be received from micro-climate manager 104, which may be integral with or separate from computing device 102.

Optionally, methods 800 may perform block 804, which may be performed prior to or after block 802. At block 804, projected micro-locations of the user are determined. In some cases micro-climates received at block 802 are requested responsive to block 804, though this is not required. Instead, multiple micro-climates can be received and some of them presented based on projected micro-locations for the user.

These projected micro-locations can be determined based on a user calendar, user history, current location, or explicit user entry of a projected location. When based on a user calendar, the calendar indicates sufficient information to determine micro-locations, such as calendar entries indicating that the user has a meeting at a building three blocks away, that he or she is meeting his or her children at a park, or has a date at a restaurant. Based on this information, the techniques may determine where a user will be and when. Thus, if the user will be walking from one building to another along a street to make a 3 pm appointment, the user will likely be walking on that street from 335 to 350 pm, and so forth. The techniques may also use a current location, such as a user's computing device having a global positioning service or other location-determining system whereby a user's future location can be projected. Thus, if a user is currently walking south down a street, the techniques can project likely micro-locations further down that street and areas east and west of a next intersection that are south of the street. Similarly, if a user history indicates that a user has a habit of walking his or her dog at 615 pm each night, or at some time relative to when the user comes home (e.g., 30 minutes after arriving home, arriving home determined from location data of the mobile device), the techniques may determine projected micro-locations and times for the walk.

At block 806, one or more of the micro-climates is presented in a user interface of the computing device. This micro-climate can be the current or projected micro-climate, and can be presented alone or along with micro-locations. This presentation can simply list micro-locations, like 48$^{th}$ Ave. between Hawthorn and Miller Streets, for example, along with a micro-climate for that micro-location.

In some cases, however, micro-climates are presented by climate interface 210 with the micro-climates visually associated with projected micro-locations for the user, which can be determined at block 804. One manner in which this alternative can be performed is shown at block 808, at which a map having projected micro-locations and micro-climates is presented. By way of example, consider FIG. 9, which illustrates climate interface 902 shown on smart phone 102-1 of FIG. 2. Climate interface 902 presents a map 904 having a projected path 906, which includes a series of projected micro-locations 908 (shown at 908-1, 908-2, and 908-3) and respective micro-climates 910 (either current or projected, shown at 910-1, 910-2, and 910-3) for these micro-locations.

Figure 9:
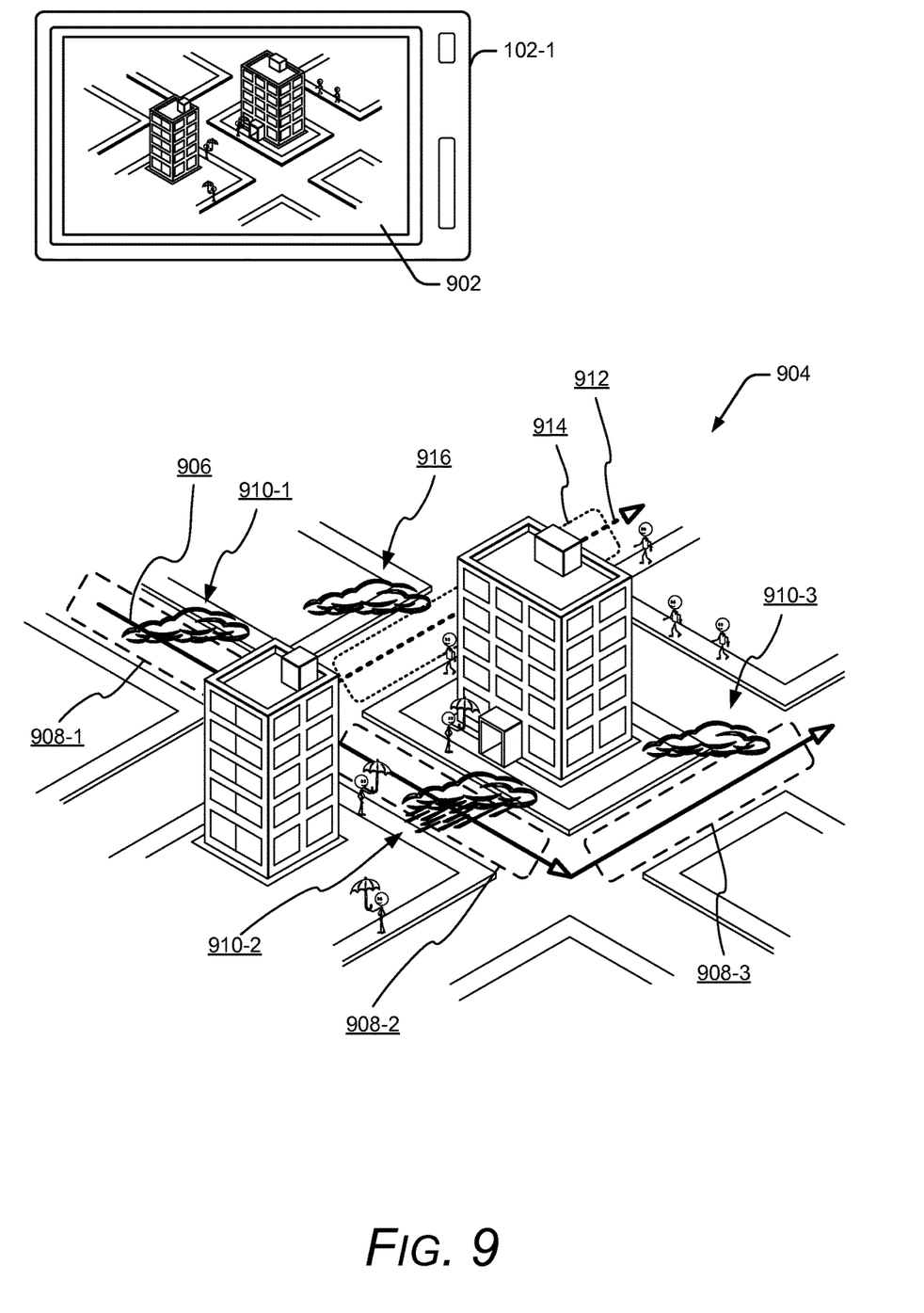
FIG. 9 illustrates a climate interface on a smart phone that presents a map having a projected path with projected micro-locations and their respective micro-climates.

While not required, the techniques may use micro-climates and their associated micro-locations to determine alternative or preferred paths (e.g., whether or not a particular path is projected, preferred paths can be provided that go from point A to point B). These alternative paths provide other, current or projected micro-climates superior to the current or projected micro-climates of the projected path (and generally having a same final location as the projected path). Continuing the ongoing example, climate interface 902 may present alternative path 912, which includes an alternative micro-location 914 having micro-climate 916. Note that this alternative path 912 presents an option for the user to avoid rain along the user's projected path 906 (rain is shown at 910-2).

Example Device

Figure 10:
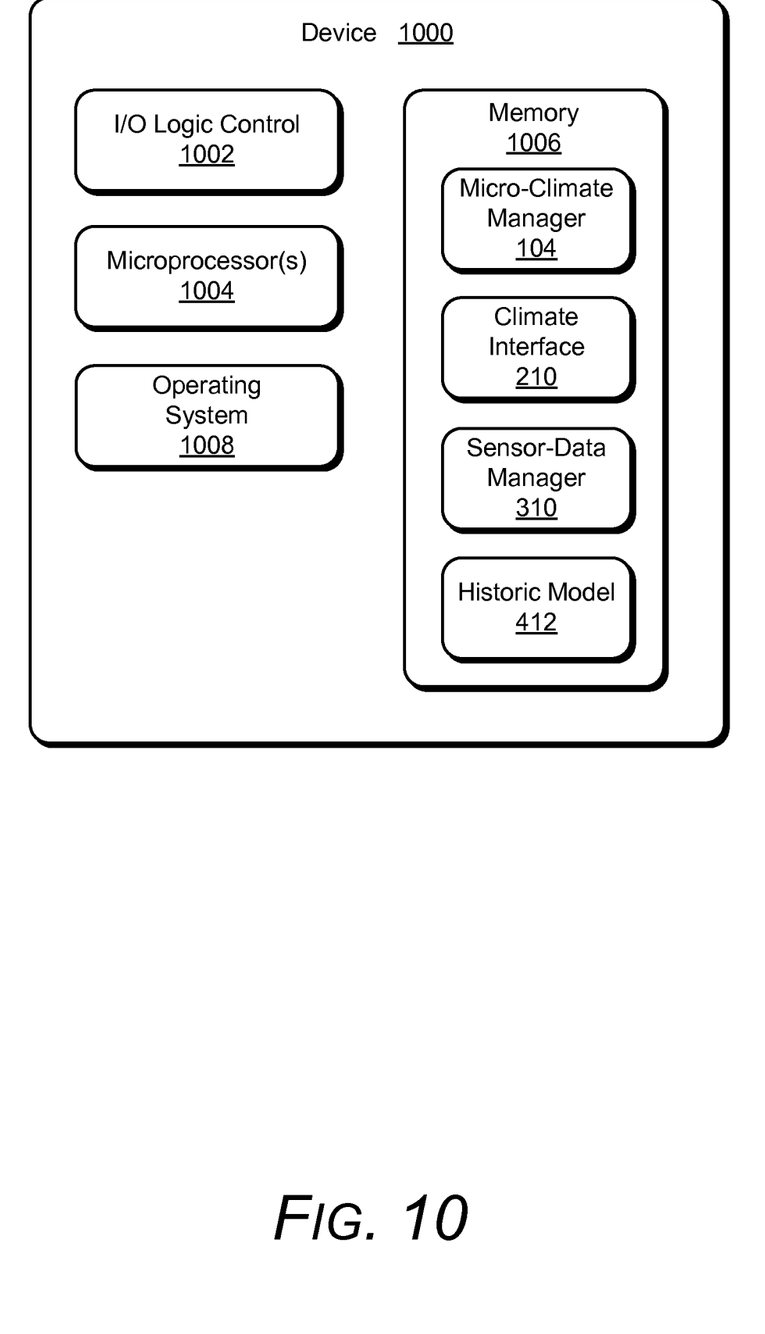
FIG. 10 illustrates various components of an example device that can implement techniques for determining micro-climates based on weather-related sensor data from mobile devices, as well as other techniques described herein.

FIG. 10 illustrates various components of an example device 1000 having micro-climate manager 104, climate interface 210, sensor-data manager 310, and/or historic module 412. These components are implemented in hardware, firmware, and/or software and as described with reference to any of the previous FIGS. 1-9.

Example device 1000 can be implemented in a fixed or mobile device being one or a combination of a media device, computing device (e.g., computing device 102, mobile device 106, and/or server 402 of FIGS. 1-4), television set-top box, video processing and/or rendering device, appliance device, a closed-and-sealed computing resource (such as some digital video recorders or global-positioning-satellite devices,), gaming device, electronic device, vehicle, and/or workstation.

Example device 1000 can be integrated with electronic circuitry, a microprocessor, memory, input-output (I/O) logic control, communication interfaces and components, other hardware, firmware, and/or software needed to run an entire device. Example device 1000 can also include an integrated data bus (not shown) that couples the various components of the computing device for data communication between the components.

Example device 1000 includes various components such as an input-output (I/O) logic control 1002 (e.g., to include electronic circuitry) and microprocessor(s) 1004 (e.g., microcontroller or digital signal processor). Example device 1000 also includes a memory 1006, which can be any type of random access memory (RAM), a low-latency nonvolatile memory (e.g., flash memory), read only memory (ROM), and/or other suitable electronic data storage. Memory 1006 includes or has access to one or more of micro-climate manager 104, climate interface 210, sensor-data manager 310, or historic module 412.

Example device 1000 can also include various firmware and/or software, such as an operating system 1008, which, along with other components, can be computer-executable instructions maintained by memory 1006 and executed by microprocessor 1004. Example device 1000 can also include other various communication interfaces and components, wireless LAN (WLAN) or wireless PAN (WPAN) components, other hardware, firmware, and/or software.

Other example capabilities and functions of these managers, modules, models, and interfaces are described with reference to elements shown in FIGS. 1-4. These components, either independently or in combination with other entities, can be implemented as computer-executable instructions maintained by memory 1006 and executed by microprocessor 1004 to implement various embodiments and/or features described herein. Alternatively or additionally, any or all of these components can be implemented as hardware, firmware, fixed logic circuitry, or any combination thereof that is implemented in connection with the I/O logic control 1002 and/or other signal processing and control circuits of example device 1000. Furthermore, some of these components may act separate from device 1000, such as when remote (e.g., cloud-based) entities perform services for climate-manager 104 or climate interface 210.

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
    receiving current interpretable weather-related sensor data from mobile devices associated with users, the current interpretable weather-related sensor data sensed by the mobile devices at a micro-location; and
    determining, based on: 1) the current interpretable weather-related sensor data, 2) an historic model correlating weather conditions and sensor data, and 3) historic location data for the micro-location, the historic location data for the micro-location indicating a likelihood of various weather conditions, a current micro-climate for the micro-location, wherein the micro-location is an area of two blocks or less.

2. A method as recited in claim 1, wherein the historic model correlates historic weather conditions and historic weather-related sensor data and determining the current micro-climate for the micro-location includes determining similarities between the current interpretable weather-related sensor data and the historic weather-related sensor data.

3. A method as recited in claim 1, wherein determining the current micro-climate for the micro-location is further based on historic user-specific data for one of the users from which current interpretable weather-related sensor data is received, the historic user-specific data for the one user indicating a correlation between the weather conditions and the one user's current interpretable weather-related sensor data.

4. A method as recited in claim 1, wherein determining the current micro-climate for the micro-location is further based on a determined, current micro-climate for a neighboring micro-location, the micro-location being a street or alleyway and the neighboring micro-location being another street or alleyway roughly parallel to the street or alleyway, or the neighboring micro-location being an immediately adjacent one-block or two-block area to the micro-location.

5. A method as recited in claim 1, further comprising providing the current micro-climate to a user, a request having been received from the user or the user having been projected to soon be at the micro-location.

6. A method as recited in claim 1, further comprising determining a projected micro-climate for the micro-location based on the current micro-climate and providing the projected micro-climate.

7. A method as recited in claim 6, wherein determining the projected micro-climate for the micro-location is further based on multi-time micro-climates for neighboring micro-locations.

8. A method as recited in claim 1, wherein the current interpretable weather-related sensor data includes one or more of: an audio recording of a microphone of one the mobile devices; an orientation of one the mobile devices; a movement read by an accelerometer of one of the mobile devices; an image or video recording of a camera of one the mobile devices; an on or off condition of one the mobile devices; or an effectiveness of a touch screen of one the mobile devices.

9. A method comprising:
    correlating historic weather conditions to historic weather-related sensor data sensed by mobile devices, the historic weather-related sensor data being sensor data that does not explicitly indicate a weather condition and including one or more of:
        an audio recording of a microphone of one the mobile devices;
        an orientation of one the mobile devices;
        a movement read by an accelerometer of one of the mobile devices;
        an image or video recording of a camera of one the mobile devices;
        an on or off condition of one the mobile devices; or
        an effectiveness of a touch screen of one the mobile devices; and
    determining an historic model based on the correlations of the historic weather conditions and the historic weather-related sensor data, the historic model for predicting micro-climates associated with corresponding micro-locations, wherein a micro-location comprises an area of two blocks or less, and wherein predicting the micro-climates is based on weather-related sensor data received from the mobile devices.

10. A method as recited in claim 9, wherein the mobile devices include smart phones, tablet computers, smart watches, smart glasses, or smart rings, each of the mobile devices capable of sensing at least one of the one or more historic weather-related sensor data.

11. A method as recited in claim 9, wherein correlating historic weather conditions correlates historic weather conditions of a geographical region to historic weather-related sensor data sensed at micro-locations within the geographical region and the historic model predicts micro-climates at the micro-locations within the geographical regions.

12. A method as recited in claim 9, wherein correlating historic weather conditions correlates historic weather conditions of a people group to historic weather-related sensor data sensed by mobile devices associated with users of that people group.

13. A method as recited in claim 9, further comprising receiving explicit user feedback related to a micro-climate determined based on the historic model, the explicit user feedback confirming, correcting, or rejecting the micro-climate and, based on the explicit user feedback, altering the historic model.

14. A method as recited in claim 13, wherein the explicit user feedback is for a particular micro-location and altering the historic model alters the historic model for the particular micro-location.

15. One or more non-transitory computer-readable storage media having processor-executable instructions thereon that, responsive to execution by a processor, perform operations comprising:
    receiving current micro-climates for micro-locations, the micro-locations comprising an area of two blocks or less, the current micro-climates received at a computing device associated with a user;
    determining the projected micro-locations of the user, the determining based at least in part on the user's calendar, the user's history, and/or the user's current location; and
    presenting, in a user interface on the computing device, one or more of the current micro-climates along with one or more projected micro-locations of the user, the presented current micro-climates visually associated with the presented projected micro-locations of the user.

16. The non-transitory computer-readable storage media of claim 15, further comprising presenting, in the user interface, a map including a projected path for the user, the projected path including the projected micro-locations and the presented current micro-climates.

17. The non-transitory computer-readable storage media of claim 16, further comprising presenting, in the user interface, an alternative path for the user, the alternative path providing other current micro-climates superior to the current micro-climates of the projected path and having a same final location as the projected path.

18. The non-transitory computer-readable storage media of claim 16, wherein determining the projected micro-locations of the user is based on a user calendar, user history, or current location of the user, the calendar indicating sufficient information to determine micro-locations, the user history including prior global or regional location data of the user, the current location indicating current global or regional location data for the user.

\* \* \* \* \*